United States Patent Office 3,275,604
Patented Sept. 27, 1966

3,275,604
MOLDABLE OXYMETHYLENE COPOLYMERS AND METHOD OF PREPARING SAME
Raymond Joseph Kray, Berkeley Heights, and Robert William Stevenson, Edison, N.J., assignors to Celanese Corporation of America, New York, N.Y., a corporation of Delaware
No Drawing. Filed July 19, 1963, Ser. No. 296,377
23 Claims. (Cl. 260—67)

This application is a continuation-in-part of application Serial No. 833,939, filed by Raymond J. Kray and Robert W. Stevenson on August 17, 1959, now abandoned.

This invention relates to novel polymers of high thermal stability and particularly to oxymethylene polymers.

Oxymethylene polymers, having recurring —$CH_2O$— units, have been known for many years. They may be prepared by polymerizing a source of oxymethylene units such as anhydrous formaldehyde or trioxane, a cyclic trimer of formaldehyde.

High molecular weight solid polyoxymethylenes have been prepared by polymerizing trioxane in the presence of certain cationic catalysts, and may also be prepared in high yields and a rapid reaction rates by the use of catalysts comprising boron fluoride coordination complexes with organic compounds, as described in Patent No. 2,989,506 of Donald E. Hudgin and Frank M. Berardinelli. Boron fluoride gas is also a rapid and effective catalyst, as disclosed in Patent No. 2,989,507 of Hudgin and Berardinelli. Other catalysts are disclosed in the article by Kern et al. in Angewandte Chemie, 73 (6), pages 176–186 (March 21, 1961).

Oxymethylene polymers of improved thermal stability may be prepared by introducing into the polymer chains, or attaching to the ends of the polymer chains, structures which are resistant to thermal or chemical detachment. The polymers may incorporate interspersed oxyalkylene units with adjacent carbon atoms, preferably oxyethylene units, as disclosed in Patent No. 3,027,352 of Walling, Brown and Bartz. Copolymers of this type may be described as having at least one chain containing oxymethylene (—$OCH_2$—) units (usually at least 85 mol percent) interspersed with (—O—R—) units wherein R is a divalent radical containing at least two carbon atoms directly linked to each other and positioned in the chain between the two valences, with any substituent in the R radical being inert.

Specific interspersed monomeric units which may be incorporated are those derived from lactones, carbonates, cyclic acid anhydrides or ethylenically unsaturated compounds, such as styrene, divinyl ether, vinyl acetate, vinyl methyl ketone or acrolein as disclosed in the article by the aforementioned Kern et al. The polymers may be end capped by acylation or etherification after polymerization or during polymerization by the use of selected chain transfer agents.

As used in the specification and claims, the term "oxymethylene polymers" denotes homopolymers and copolymers (including terpolymers, etc.) having at least 60% recurring oxymethylene -($CH_2O$)- units, and further includes substituted oxymethylene polymers wherein the substituents are inert, i.e., do not participate in undesirable side reactions.

It has now been found that useful moldable polymers comprising oxymethylene groups and oxyethylene groups positioned in the polymeric chain, said oxyethylene groups having a —$CH_2OR$ group pendant therefrom, may be prepared by polymerizing a source of oxymethylene units such as trioxane with a glycidyl ether. Similarly, it has been found that terpolymers containing oxymethylene groups, oxyalkylene units, and oxyethylene units having pendant —$CH_2OR$ substituents can be prepared by polymerizing a source of oxymethylene units such as trioxane with a cyclic ether having at least two adjacent carbon atoms and a glycidyl ether.

A preferred class of polymers are the terpolymers wherein the oxyalkylene groups are oxyethylene groups derived by opening the ring structure of cyclic ethers having the structure

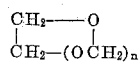

where $n$ is an integer from 0 to 2.

Among the specific cyclic ethers which may be used are ethylene oxide, 1,3, dioxolane, 1,3,5-trioxepane, 1,3-dioxane, trimethylene oxide, pentamethylene oxide, 1,2-propylene oxide, 1,2, butylene oxide, neopentyl formal, pentaerythritol diformal, paraldehyde, tetrahydrofurane and butadiene monoxide.

The glycidyl ethers are represented by the structure

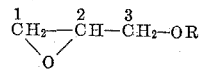

Among the specific glycidyl ethers which may be used are saturated aliphatic and cycloaliphatic glycidyl ethers such as methyl, ethyl, propyl, isopropyl, n-butyl, isobutyl, t-butyl, cyclohexyl, cyclopentyl, etc.; unsaturated aliphatic glycidyl ethers, such as allyl, vinyl, propenyl, crotyl, etc.; and aryl glycidyl ethers, such as phenyl, tolyl, xylyl, benzyl, etc.

It is believed that in the polymerization process the heterocyclic ring of the glycidyl ether opens to yield polymers having groups derived from the glycidyl ether and having structure (A)

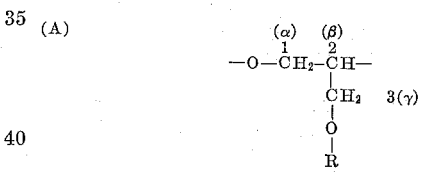

wherein the glycidyl ether yields an α oxypropylene group (i.e. the oxygen atom of the original epoxy group is bonded to the α carbon atom of a propylene group), or (B)

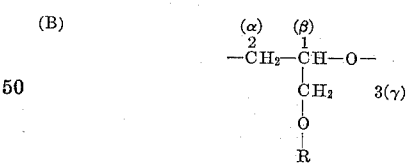

wherein the glycidyl ether yields a β oxypropylene group (i.e. the oxygen atom of the original epoxy group is bonded to the β carbon atom of a propylene group).

Since the heterocyclic ring of the glycidyl ether may open at either of the positions, either or both of the structures (A) or (B) may appear in the polymeric chain.

It will be noted that the designation of the α and β carbon atoms is made with reference to the propylene group, and not with reference to the original structure of the glycidyl ether, but for purposes of clarity, the numbering of the carbon atoms is retained as they originally appeared in the glycidyl ether.

Of course, viewed as a portion of the polymeric chain, either of structures (A) or (B) can be viewed as forming part of either an α oxypropylene or a β oxypropylene group since the terminal carbon atoms of structures (A) and (B) are each attached to an oxygen atom of the oxymethylene or oxymethylene-oxyalkylene chain.

Thus, groups of the following structure are present:

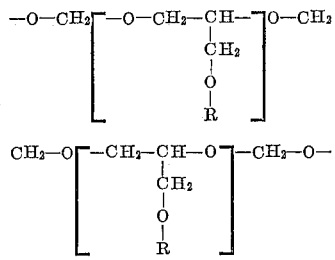

either of which structures may be termed either α oxypropylene or β oxypropylene groups, depending upon the portion of the polymer chain taken in purview. Thus, the use of the term "β oxypropylene groups" has reference to either of the structures (A) or (B) since the nomenclature is interchangeable where the oxygen of the oxymethylene chain be considered as a portion of the group produced.

Therefore, the groups derived from the glycidyl ethers may be defined as either α or β oxypropylene groups having a γ ether substituent (wherein the oxygen atom and the alpha and beta carbon atom of the original epoxy linkage are positioned in the polymeric chain) or as oxyethylene groups positioned in the polymeric chain, said oxyethylene groups having a —CH$_2$OR group pendant therefrom and directly attached to a carbon atom of said oxyethylene group, wherein said R group is a monovalent organic radical.

The preferred terpolymers contain in addition to oxymethylene groups and groups derived from the glycidyl ethers, oxyalkylene groups, which may be, for example, oxyethylene groups (and including substituted oxyethylenes, where the substituents are inert i.e. do not participate in undesirable side reactions). It is to be understood, however, that where the terpolymers are defined as having (1) oxyalkylene groups and also having (2) oxyethylene groups with —CH$_2$OR substituents the recitation to these groups is intended to be mutually excusive i.e. where the specification and claims recite the presence of both groups (1) and (2) and especially where certain proportions are recited, it is intended that two distinct groups appear and that recitation of one group be considered as exclusive of the other for purposes of definition.

The copolymers generally contain from about 60 to 99.6 percent by weight of recurring oxymethylene units, and from about 0.4 to about 40 weight percent of recurring oxyethylene groups having a —CH$_2$OR substituent. The preferred copolymers contain from about 80 to 99.5 percent by weight of recurring oxymethylene units, and from about 19.5 to about 0.5 weight percent of recurring oxyethylene groups having a —CH$_2$OR substituent.

The terpolymers generally contain from about 60 to 99.6, preferably 80 to about 99.5 percent by weight of recurring oxymethylene units, from about 0.4 to about 39.6, preferably from about 0.5 to about 19.5 weight percent of recurring oxyalkylene units, and from about 0.4 to about 39.6, preferably from about 0.5 to about 19.5 weight percent of oxyethylene units having a —CH$_2$OR substituent.

The preferred catalysts used in the preparation of the desired polymers are the boron fluoride coordinate complexes with organic compounds in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is the preferred coordination complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be removed for best yield.

In a specific embodiment of this invention, trioxane, glycidyl ether and catalyst are dissolved in a common anhydrous solvent such as cyclohexane, and permitted to react in a sealed reaction zone.

In another specific embodiment of this invention, trioxane, cyclic ether, glycidyl ether and catalyst are dissolved in a common anhydrous solvent such as cyclohexane, and permitted to react in a sealed reaction zone.

The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred. In either the copolymerization or terpolymerization process, it may be desirable to utilize a delayed addition technique for any of the monomers, and particularly the glycidyl ethers.

It has been found that the relatively minor amounts of the cyclic ether with adjacent carbon atoms and glycidyl ether used in the copolymerization reaction generally disappear completely from the reaction mixture. The required ratios of trioxane to cyclic ether and glycidyl ether in the reaction mixture may therefore be roughly predetermined for a desired mol ratio in the polymer by assuming a particular conversion level from previous experience under substantially comparable conditions.

In order to obtain a desired proportion of oxyalkylene units in the terpolymer, the chemical constitution of the cyclic ether must also be considered. Thus, 1,3-dioxolane contains both an oxymethylene group and an oxyethylene group. Its incorporation into the terpolymer molecule increases both the oxymethylene and the oxyethylene content of the polymer molecule.

In general, the cyclic ether with adjacent carbon atoms is present in the reaction mixture in amounts between about 0.4 and about 40, preferably between about 0.5 and about 20 weight percent, based on the total weight of monomer. The glycidyl ether is present in the reaction zone in amounts between about 0.4 and about 40, preferably between about 0.5 and about 20 weight percent, based on the total weight of monomer. The optimum proportion of each of the comonomers will depend upon the particular terpolymer desired, the expected degree of conversion and the chemical constitution of the cyclic ethers used.

Many of the comonomers, and particularly the glycidyl ethers, are more reactive with respect to polymerization than trioxane. It may therefore be found to be advantageous to add at least a portion of the comonomers, or at least the glycidyl ether, after the polymerization reaction has commenced.

Upon completion of the polymerization reaction, it is desirable to neutralize the activity of the polymerization catalyst since prolonged contact with the catalyst degrades the polymer. The polymerization product may be treated with an aliphatic amine, such as tri-n-butyl-amine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Patent 2,989,509 of Donald E. Hudgin and Frank M. Berardinelli.

*Example I.—Terpolymer*

To a mixture of 180 grams of trioxane, 5 grams of dioxolane, 60 grams of cyclohexane, and 0.35 milliliter of boron fluoride dibutyl etherate dissolved in 3 grams of cyclohexane there was added 15 grams of allyl glycidyl ether at a uniform rate over a period of an hour. The temperature of the reaction mixture was permitted to rise to 80° C. by the exothermic heat of reaction. The polymer was slurried once with methanol and twice with hot water; the polymer was recovered from the slurries by filtration, to give after the final filtration and drying 135 grams of a white powdery polymer having a melting range between 120 and 140 degrees C. The polymer had a carbon content of 41.2%. Assuming that all of the dioxolane had entered the polymerization the carbon content corresponds to a copolymer having 4 weight percent of oxyethylene units having $-CH_2OR$ substituents, wherein R is an allyl group.

*Example II.—Terpolymer*

The polymerization of Example I was repeated except that the catalyst content of the initial mixture was 0.15 weight percent based upon the total charge, and the allyl glycidyl ether was added in a batch charge.

After 3½ hours of reaction, a polymer was recovered having a melting range between 120 and 140° C., and a carbon content of 41.2%, corresponding to a polymer having 4 weight percent of units derived from the glycidyl ether, assuming that all of the dioxolane had entered the polymerization. The polymer powder alone had a thermal decomposition constant at 220° C. of 2.2%, and when stabilized with 2% of 2,2'-methylene bis(4-methyl-6-tertiary butyl phenol) gave a decomposition constant of 0.0% The degradation constants were measured by loss of weight in percent/min. in a Brabender moisture tester in a circulating air atmosphere.

*Example III.—Terpolymer*

The polymerization of Example I was repeated except that the catalyst content of the initial mixture was 0.064 weight percent based upon the total charge, and the glycidyl ether used was phenyl glycidyl ether, which was charged in a delayed addition. After 24 hours at about 62 degrees, polymer was recovered having a melting range of about 164–172° C., an inherent viscosity (measured as a 0.1 weight percent solution in 92/2 p-chlorophenol α-pinene) of 0.50, and a carbon content of 43.0%, corresponding to a polymer having 90.8 percent of oxymethylene units derived from trioxane.

*Example IV.—Terpolymer*

The polymerization of Example I was repeated except that the catalyst content of the initial mixture was 0.18 milliliters and the glycidyl ether used was phenyl glycidyl ether. The reaction period was 24 hours with maximum reaction temperature of 62° C. The polymer (recovered as disclosed above) was a white powder having a melting point of 164 to 172° C. The polymer had a carbon content of 42.9 weight percent corresponding to a terpolymer containing 6.7 weight percent of oxyethylene groups having $-CH_2OR$ substituents, wherein R is a phenyl group (on the assumption that all of the dioxolane had entered the terpolymer). The polymer when stabilized with 2 weight percent of 2,2'-methylene-bis (4-methyl-6-tertiary-butyl phenol) could be molded to a disc by compression molding at 175° C. under a pressure of 1500 pounds per square inch over a period of 3 minutes.

*Example V.—Copolymer*

To 80 grams of trioxane, 0.021 weight percent of boron fluoride dibutyl etherate, 30 weight percent of cyclohexane, and 4 to 8 drops of phenyl glycidyl ether (added to the reaction mixture before adding the catalyst) in a reaction flask was added gradually 20 grams of phenyl glycidyl ether. A temperature of 20° C. was used to start the reaction, and after reaction at 45–60° C. for 3 hours, polymer was recovered having a melting range of about 144 to 167° C., an inherent viscosity of 0.70, and a carbon content of 41.4%, corresponding to a polymer having 92.3% oxymethylene units derived from trioxane.

*Example VI.—Copolymer*

The polymerization of Example V was repeated. After 2½ hours of reaction polymer was recovered having a melting range of about 139–168° C., an inherent viscosity of 0.62, and a carbon content of 41.8, corresponding to a polymer having 93.8 percent oxymethylene units derived from trioxane.

*Example VII.—Copolymer*

To 25 grams of trioxane, 0.6 weight percent of boron fluoride dibutyl etherate was added to 25 grams of allyl glycidyl ether. After 17 hours at 90° C., polymer was recovered having a melting range of 140–153° C., and which was insoluble in the 92/2 p-chlorophenol/α-pinene system.

The preferred polymers of this invention may be characterized as normally solid (i.e. at room temperature and atmospheric pressure), and generally thermoplastic or moldable into shaped articles by injection and compression molding techniques. The most preferred polymers have a melting point above about 120° C. and a number average molecular weight of above about 5000, as represented by an inherent viscosity of a 0.1 weight percent solution of polymer in 92/2 p-chlorophenol/α-pinene of at least about 0.5.

It is to be understood that the foregoing detailed description is given merely by way of illustration and that many variations may be made therein without departing from the spirit of our invention.

The embodiments of the invention in which an exclusive property or privilege is claimed are defined as follows:

1. A normally solid, moldable copolymer comprising:
   (a) at least 60 mol percent of recurring oxymethylene groups and
   (b) oxyethylene groups positioned in the polymeric chain, said oxyethylene groups having a $-CH_2OR$ group pendant therefrom and directly attached to a carbon atom of said oxyethylene group, wherein said R group is a monovalent hydrocarbon radical.

2. A normally solid, moldable terpolymer comprising:
   (a) at least 60 mol percent of recurring oxymethylene groups,
   (b) oxyalkylene groups containing at least two carbon atoms positioned in the polymeric chain, and
   (c) oxyethylene groups positioned in the polymeric chain, said oxyethylene groups having a $-CH_2OR$ group pendant therefrom and directly attached to a carbon atom of said oxyethylene group, wherein said R group is a monovalent hydrocarbon radical.

3. The copolymer of claim 1, wherein R is a monovalent hydrocarbon radical selected from the group consisting of saturated aliphatic and cycloaliphatic, unsaturated aliphatic, and aryl radicals, having up to about 8 carbon atoms.

4. A normally solid, moldable copolymer consisting essentially of
   (a) at least 60 mol percent of recurring oxymethylene ($-CH_2O-$) units; and
   (b) at least 0.4 mol percent up to about 40 mol percent of recurring groups having the structure

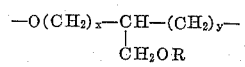

wherein x and y are integers from zero to 1, and x and y equal one, and wherein R is a monovalent hydrocarbon radical selected from the group consisting of saturated aliphatic and cycloaliphatic, unsaturated aliphatic, and aryl radicals having up to about 8 carbon atoms.

5. A normally solid, moldable copolymer consisting essentially of
   (a) at least 80 mol percent of recurring oxymethylene (—CH$_2$O—) units; and
   (b) at least 0.5 mol percent up to about 19.5 mol percent of recurring groups having the structure

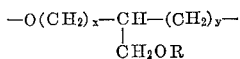

wherein $x$ and $y$ are integers from zero to 1, and $x$ and $y$ equal one, and wherein R is a monovalent hydrocarbon radical selected from the group consisting of saturated aliphatic and cycloaliphatic, unsaturated aliphatic, and aryl radicals having up to about 8 carbon atoms.

6. A normally solid, moldable terpolymer consisting essentially of
   (a) at least 60 mol percent of recurring oxymethylene (—CH$_2$O—) units;
   (b) at least 0.4 mol percent up to about 40 mol percent of recurring oxyalkylene groups

wherein $n$ is an integer from 1 to 5; and
   (c) at least 0.4 mol percent up to about 40 mol percent of recurring groups having the structure

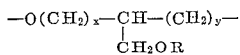

wherein $x$ and $y$ are integers from zero to 1, and $x$ and $y$ equal one, and wherein R is a monovalent hydrocarbon radical selected from the group consisting of saturated aliphatic and cycloaliphatic, unsaturated aliphatic, and aryl radicals having up to about 8 carbon atoms.

7. A normally solid, moldable terpolymer consisting essentially of
   (a) at least 80 mol percent of recurring oxymethylene (—CH$_2$O—) units;
   (b) at least 0.5 mol percent up to about 19.5 mol percent of recurring oxyalkylene groups

wherein $n$ is an integer from 1 to 5; and
   (c) at least 0.5 mol percent up to about 19.5 mol percent of recurring groups having the structure

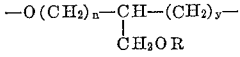

wherein $x$ and $y$ are integers from zero to 1, and $x$ and $y$ equal one, and wherein R is

8. A normally solid, moldable terpolymer consisting essentially of
   (a) at least 80 mol percent of recurring oxymethylene (—CH$_2$O—) units;
   (b) at least 0.5 mol percent up to about 19.5 mol percent of recurring oxyalkylene groups

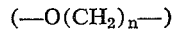

wherein $n$ is an integer from 1 to 5; and
   (c) at least 0.5 mol percent up to about 19.5 mol percent of recurring groups having the structure

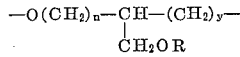

wherein $x$ and $y$ are integers from zero to 1, and $x$ and $y$ equal one, and wherein R is

—CH$_2$CH=CH$_2$

9. A method of preparing a normally solid moldable copolymer which comprises copolymerizing trioxane and a glycidyl ether in the presence of a trioxane polymerization catalyst, and recovering a normally solid, moldable copolymer comprising:
   (a) at least 60 mol percent of recurring oxymethylene groups and
   (b) oxyethylene groups positioned in the polymeric chain, said oxyethylene groups having a —CH$_2$OR group pendant therefrom and directly attached to a carbon atom of said oxyethylene group, wherein said R group is a monovalent hydrocarbon radical.

10. A method of preparing a normally solid moldable terpolymer which comprises copolymerizing trioxane, a cyclic ether having at least two adjacent carbon atoms and a glycidyl ether in the presence of a trioxane polymerization catalyst, and recovering a normally solid, moldable terpolymer comprising:
    (a) at least 60 mol percent of recurring oxymethylene groups,
    (b) oxyalkylene groups containing at least two carbon atoms positioned in the polymeric chain, and
    (c) oxyethylene groups positioned in the polymeric chain, said oxyethylene groups having a —CH$_2$OR group pendant therefrom and directly attached to a carbon atom of said oxyethylene group, wherein said R group is a monovalent hydrocarbon radical.

11. A method of preparing a normally solid moldable terpolymer which comprises copolymerizing trioxane with from 0.5 to 19.5 weight percent of a cyclic ether having at least two adjacent carbon atoms and 0.5 to 19.5 weight percent of a glycidyl ether, based on the total monomer weight in the presence of a boron fluoride-containing polymerization catalyst.

12. The process of claim 11 wherein said cyclic ether is dioxolane.

13. The process of claim 11 wherein said glycidyl ether is allyl glycidyl ether.

14. The process of claim 11 wherein said glycidyl ether is phenyl glycidyl ether.

15. A method of preparing a normally solid moldable copolymer which comprises copolymerizing from about 80 to 99.5 weight percent of trioxane with from about 0.5 to 20 weight percent of a glycidyl ether, based on the total monomer weight, at a temperature between about 0 and 100° C. and a pressure between about 0 and 100 atmospheres in the presence of a boron fluoride-containing polymerization catalyst.

16. A method of preparing a normally solid moldable terpolymer which comprises copolymerizing from about 80 to 99.5 weight percent of trioxane with from about 0.5 to 19.5 weight percent of a glycidyl ether and from about 0.5 to 19.5 weight percent of a cyclic ether having adjacent carbon atoms, based upon the total monomer weight, at a temperature between about 0 and 100° C. and a pressure between about 0 and 100 atmospheres in the presence of a boron fluoride-containing polymerization catalyst.

17. A method of preparing a normally solid moldable terpolymer which comprises copolymerizing from about 80 to 99.5 weight percent of trioxane with from about 0.5 to 19.5 weight percent of a glycidyl ether, and from about 0.5 to 19.5 weight percent of a cyclic ether having adjacent carbon atoms, based upon the total monomer weight, at a temperature between about 0 and 100° C. and a pressure between about 0 and 100 atmospheres for a period between about 5 min. and 72 hours in a solution comprising an inert solvent in the presence of a boron fluoride-containing polymerization catalyst.

18. The method of claim 17, wherein said glycidyl ether is allyl glycidyl ether.

19. The method of claim 17, wherein said glycidyl ether is phenyl glycidyl ether.

20. A method of preparing a normally solid, moldable copolymer which comprises contacting from about 80 to 99.5 weight percent of trioxane and from about 0.5 to 19.5 weight percent of allyl glycidyl ether, based upon the total monomer weight, with from about 0.001 to about 1.0 weight percent, based upon the total monomer weight, of a coordinate complex of boron trifluoride in which oxygen is the donor atom, at a temperature between about 0 and 100° C. and a pressure between about 0 and 100 atmospheres for a period between about 5 minutes and 72 hours in a solution comprising an inert solvent.

21. The method of claim 20, wherein said boron trifluoride coordinate complex is boron trifluoride dibutyl etherate.

22. A method of preparing a normally solid, moldable terpolymer comprising contacting from about 80 to 99.5 weight percent of trioxane, from about 0.5 to 19.5 weight percent of allyl glycidyl ether, and from about 0.5 to 19.5 weight percent of dioxolane, based upon the total monomer weight, with from about 0.001 to about 1.0 weight percent based upon the total monomer weight of a catalyst selected from the group consisting of boron trifluoride and coordinate complexes of boron trifluoride in which oxygen is the donor atom, at a temperature between about 0 and 100° C. and a pressure between about 0 and 100 atmospheres, for a period between about 5 minutes and 72 hours, in a solution comprising an inert solvent.

23. A method of preparing a normally solid, moldable terpolymer comprising contacting from about 80 to 99.5 weight percent of trioxane, from about 0.5 to 19.5 weight percent of phenyl glycidyl ether, and from about 0.5 to 19.5 weight percent of dioxolane, base upon the total monomer weight, with from about 0.001 and about 1.0 weight percent based upon the total monomer weight of a catalyst selected from the group consisting of boron trifluoride and coordinate complexes of boron trifluoride in which oxygen is the donor atom, at a temperature between about 0 and 100° C. and a pressure between about 0 and 100 atmospheres, for a period between about 5 minutes and 72 hours, in a solution comprising an inert solvent.

References Cited by the Examiner

UNITED STATES PATENTS

| | | | |
|---|---|---|---|
| 2,989,508 | 6/1961 | Hudgin | 260—67 |
| 3,027,352 | 3/1962 | Walling et al. | 260—67 |
| 3,087,913 | 4/1963 | Kray et al. | 260—73 |
| 3,133,905 | 5/1964 | Snyder et al. | 260—88.3 |
| 3,158,591 | 11/1964 | Vandenberg | 260—88.3 |

OTHER REFERENCES

Noshay et al., Journal of Polymer Science, vol. 34, No. 127, 1959, pp. 165–170.

Colclough et al., Journal of Polymer Science, vol. 34, No. 127, January 1959, pp. 171–179.

WILLIAM H. SHORT, *Primary Examiner.*

L. M. MILLER, *Assistant Examiner.*